United States Patent [19]

Schlipf et al.

[11] Patent Number: 5,213,896
[45] Date of Patent: May 25, 1993

[54] FLUORINE-CONTAINING POWDER COATING

[75] Inventors: Michael Schlipf, Burgkirchen; Gerhard Merten, Wiesbaden, both of Fed. Rep. of Germany

[73] Assignee: Hoechst Aktiengesellschaft, Frankfurt am Main, Fed. Rep. of Germany

[21] Appl. No.: 806,737

[22] Filed: Dec. 12, 1991

[30] Foreign Application Priority Data

Dec. 15, 1990 [DE] Fed. Rep. of Germany ....... 4040127

[51] Int. Cl.$^5$ .................. B32B 5/16; C08F 14/18
[52] U.S. Cl. .................. 428/407; 428/463; 526/249; 526/254; 526/255
[58] Field of Search .......... 526/247, 249, 255, 254; 428/407, 463

[56] References Cited

U.S. PATENT DOCUMENTS 4,584,343 4/1986 Löhr et al. ................ 525/60
4,859,755 8/1989 Schlipf et al. .............. 526/255

FOREIGN PATENT DOCUMENTS 0150430 8/1985 European Pat. Off. .
63-301268 12/1988 Japan .................. 526/247
64-29450 1/1989 Japan .................. 526/247

Primary Examiner—Joseph L. Schofer
Assistant Examiner—N. Sarofim

[57] ABSTRACT

A fluorine-containing powder coating is described, comprising a) a crosslinkable, fluorine-containing copolymer, composed of a vinyl ester of a highly branched carboxylic acid, whose acyl radical has 9 carbon atoms and is composed of isomers having two quaternary carbon atoms, to which 0 to 80 mol% of isomers which contain one quaternary carbon atom together with at least one tertiary carbon atom in the acyl radical are admixed, of a vinyl monomer containing OH groups, and of a fluoroolefin of the general formula $$CF_2=CFX,$$

in which $X=F$, a perfluoroalkyl radical having 1 to 8 carbon atoms or Cl, and b) 20 to 60% by weight of a crosslinking agent suitable for powder coating formulations.

Preferably, the latter is a blocked polyisocyanate.

9 Claims, No Drawings

FLUORINE-CONTAINING POWDER COATING

DESCRIPTION

The invention relates to a fluorine-containing powder coating.

Fluorine-containing paint systems, which are composed of suitable crosslinkable copolymers and conventional cold-or hot-curing crosslinking agents and, from an organic solvent phase, give highly durable corrosion- and weathering-resistant finishes, are known in diverse variants, in particular with respect to the fluorine-containing copolymers used. For reasons of protecting the environment and the atmosphere, however, attempts are now being made to use paint systems of high solvent content only where it is absolute,ly necessary. Attempts have therefore already been made to create purely aqueous or aqueous-organic paint systems. However, this is subject to narrow limits, since only a small part of the fluorine-containing copolymers available for paint systems is suitable for aqueous paint systems. The higher energy consumption and the considerably extended drying time are also disadvantageous properties, the latter especially because of the increased risk of soiling during the drying period. It was therefore the object to avoid these disadvantages.

To achieve this object, the present invention provides a fluorine-containing powder coating, comprising a) 40 to 80% by weight of a crosslinkable, fluorine-containing copolymer, composed of α) 10 to 60 mol% of copolymerized units of a vinyl ester of the general formula

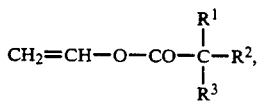

in which $R^1$, $R^2$ and $R^3$ are alkyl radicals, the complete acyl radical having 9 carbon atoms and being composed of isomers with two quaternary carbon atoms, to which 0 to 80 mol % of isomers containing one quaternary carbon atom together with at least one tertiary carbon atom in the acyl radical are admixed, β) 20 to 50 mol % of copolymerized units of a vinyl monomer containing OH groups, and of γ) copolymerized units of a fluoroolefin of the general formula

in which X=F, a perfluoroalkyl radical having 1 to 8 carbon atoms or Cl, especially in an amount makes the total of components α)+β)+γ) up to 100 mol %, but with the proviso that at least 10 mol % of this fluoroolefin is present in the copolymer, and b) 20 to 60% by weight of a crosslinking agent suitable for powder coatin formulations.

The vinyl ester of component α), contained in the copolymer a) used according to the invention, possesses an acyl radical of the general formula

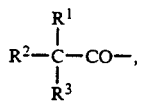

which has 9 carbon atoms in total and, as a special characteristic, a further quaternary carbon atom in addition to the quaternary carbon atom of the above formula in the alpha-position relative to the CO group. These isomers having two quaternary carbon atoms can be present here by themselves—especially as a mixture—or contain 0 to 80 mol % of such isomers which, in addition to the quaternary carbon atom located in the alpha-position relative to the CO group, at least one further tertiary carbon atom.

Preferably, the acyl radical of these vinyl esters is an isomer mixture which, in addition to the isomers with two quaternary carbon atoms, also contains a further 0.5 to 80 mol % of isomers having one quaternary and two tertiary carbon atoms in the same molecule or 0.5 to 20 mol % of isomers having one quaternary and one tertiary carbon atom in the same molecule. It is also possible for all three said species to be present, the proportions to be selected such that they make up to 100. Such highly branched vinyl esters virtually completely withstand saponification.

The highly branched carboxylic acids, on which these acyl radicals are based, can be obtained by dimerization of isobutene and subsequent Koch synthesis of these dimers with carbon monoxide and water. The corresponding vinyl esters can be obtained by transvinylation with vinyl acetate. However, they can also be obtained according to the Reppe synthesis by reaction the carboxylic acids with acetylene.

Suitable vinyl monomers, containing OH groups, for component β) of the copolymer are intended to provide the OH groups required for crosslinking in the paint system. These monomers can already contain OH groups as such, or the OH groups can be formed on the already finished copolymer from functional groups which are amenable to hydrolysis or alcoholysis to give OH groups. The former type of such monomers preferably represents hydroxyalkyl vinyl ethers having a hydroxyalkyl group of 1 to 6 carbon atoms. Such copolymers are known from U.S. Pat. No. 4,859,755. The second type of such monomers preferably represents vinyl esters of short-chain carboxylic acids of the formula

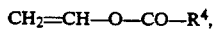

in which $R^4$ is methyl, ethyl or propyl radical, which as such are saponifiable, especially those of carboxylic acids. These are above all vinyl propionate and especially vinyl acetate.

Component γ) of the copolymer according to the invention is a fluoroolefin of the general formula

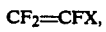

in which X=F, a perfluoroalkyl radical having 1 to 8 carbon atoms or Cl, i.e. for example perfluoro-1-butene, perfluoro-1-octene, perfluoro-1-hexene and perfluoroisobutene, and preferably hexafluoropropylene, chlorotrifluoroethylene and especially tetrafluoroethylene (TFE), which are present in the abovementioned proportions, but the proportion should not be less than 10 mol %, preferably 20 mol %.

The preparation of the copolymers used according to the invention is carried out in such a way that initially the branched-chain vinyl ester of component α), the vinyl monomer, containing OH groups, of component β) and the fluoroolefin of component γ) are subjected to copolymerization.

The copolymer thus obtained—if it contains one of the abovementioned vinyl esters of a short-chain carboxylic acid—is then subjected to an aftertreatment for the purpose of saponifying the units of this vinyl ester, the term "saponification" here being intended to comprise the ester cleavage by hydrolysis and/or by alcoholysis. For this purpose, the pulverulent copolymer can first dissolved in an alkanol having 1 to 4 carbon atoms and then be precipitated with water. The saponification can also be effected with aqueous alkalis or quaternary ammonium hydroxides.

For working up copolymers present in solution, a process is advantageously applied in which
a) the main part of the solvent is first removed by distillation under normal pressure,
b) the residual monomers are then removed by vacuum distillation with forced transfer of the hi9hly viscous copolymer,
c) this highly viscous copolymer is dissolved in a mixture of an alkanol having 1 to 4 carbon atoms and a solvent, it being intended that this mixture be capable of homogeneously dissolving also the saponified product, and
d) the saponification is carried out with addition of an alkaline agent, the solvent from c) is, if necessary, separated off by distillation and the remaining highly viscous copolymer is dissolved in a paint solvent, and
e) the resulting copolymer solution is subjected to filtration and subsequently the solvent is completely removed.

By the said process, it is possible to convert the units of the said vinyl ester to an extent of 50 to 100%, preferably of 50 to 80%, into OH groups and, after grinding, to obtain a fine pulverulent copolymer.

To produce a powder coating, the pulverulent copolymer containing OH groups is mixed with further components and converted by extrusion, preliminary breaking, fine grinding and final screening, with oversize of > 125 μm being separated off, into a powder coating.

As component b), the powder coating according to the invention contains a crosslinking agent and additionally, if desired, pigments, fillers and other additives such as, for example, UV absorbers or flow agents. The powder coating according to the invention contains 20 to 60 and preferably 25 to 50% by weight of the crosslinking agent of component b), while the fluorine-containing copolymer a) amounts to 40 to 80 and preferably 50 to 75% by weight.

Suitable crosslinking agents (curing agents) are preferably blocked aliphatic and aromatic polyisocyanates which are formed by addition of a suitable protective group such as, for example, a caprolactam grouping or phenol grouping, or by dimerization with cyclization. Examples are blocked polyisocyanates such as are marketed by Hoechst AG under the name ®Additol XL 428, XL 432, XL 465, VXL 9935 or VXL 9946. In these compounds, the functional groups required for crosslinking are blocked in a thermally reversible manner, for example with ε-caprolactam, which is eliminated under baking conditions, whereby the crosslinking can take place as a result of the formation of urethane groups with the OH-functional groups of the fluorine-containing copolymer.

As a suitable blocking variant, the formation of uretdione structures by dimerization of two isocyanate groups is also possible. In this case, a crosslinking agent which is free of cleavage products is obtained, such as is offered, for example, by Hüls AG under the name ®IPDI BF 1540.

Further suitable curing agents for powder coatings based on fluorine-containing copolymers are polyfunctional carboxylic acid anhydrides such as are marketed, for example, by Hoechst AG under the name ®Beckopox Special Curing Agent EH 694.

For formulating the powder coatings, all pigments and extenders common in the powder coating industry can also be used, in particular titanium dioxides, iron oxides, and also cadmium sulfide, zinc sulfide, white lead, calcium carbonate, barium sulfate, phthalocyanine dyes, bentones and chalk. Preferably, titanium dioxides are used.

Conventional additives such as, for example, flow agents, degassing agents, wetting agents, UV absorbers or auxiliaries for improving gloss and adhesion can also be added to such paint recipes.

The individual components are premixed in the pulverulent state and fused in a heated extruder at an extrudate temperature of 90° to 110° C. and thus homogenized. After cooling, the extruded strand is prebroken and then subjected to fine grinding.

The fluorine-containing powder coating thus formulated has, after screening, a particle size of from 10 to 125 and preferably 10 to 70 μm. Preferably, the fine grinding is adjusted such that ≥ 50% by weight of the powder coating has particle sizes in the range from 10 to 32 μm.

The powder coatings formulated with the addition of the said crosslinking agents produce coatings which can be applied to the most diverse substrates and can be baked at elevated temperatures. Substrates for them are especially metals such as, for example, iron, steel, aluminum, copper, bronze and brass, and also other metal-coated surfaces such as glass, ceramics and concrete.

The application is effected by the corona process. In this case, the powder coating is moved past a charged corona in the application gun and thus charged.

However, coatings can also be produced by the triboelectric or electrokinetic processes. In this case, the principle of frictional electricity is utilized. The powder coating is here provided in the spraying implement with an electrostatic charge which is opposite to the charge of the friction partner, usually a hose or spray pipe, for example of polytetrafluoroethylene. A combination of both processes is also possible.

Before the coating step, the substrate can be heated to temperatures from 120° to 250° C., the layer then being baked on during application. If, however, the coating is applied to the cold substrate, subsequent heating to a temperature in the said range is necessary.

Coatings based on the powder coating according to the invention are distinguished expecially by very high weathering resistance. Due to the higher anti-adhesivity as compared with powder paint coatings which were produced without the fluorine-containing copolymer according to the invention, these coating systems show less soiling.

The increased weathering resistance is combined with better gloss retention, so that objects, which are exposed to weathering and have been coated with the powder coating according to the invention, still have their original appearance even after several years have elapsed.

The advantages which the powder coatings have in general, as compared with solvent-containing paints—the greater compatibility with the environment due to the avoidance of solvent emissions should be mentioned here in particular —also apply to the coatings which were produced on the basis of the powder paint coating system according to the invention based on fluoropolymers.

The invention is explained by the examples which follow:

EXAMPLE 1

Use of a blocked polyisocyanate as curing agent

| | |
|---|---|
| Copolymer of 37 mol % of copolymerized TFE units, 31 mol % of copolymerized units of a vinyl ester of a highly branched carboxylic acid having an acyl radical of 9 carbon atoms (the acyl radical containing an isomer mixture with 28 mol % of carbon chains with two quaternary carbon atoms, 68 mol % of carbon chains with one quaternary and two tertiary carbon atoms, 4 mol % of carbon chains with one quaternary and one tertiary carbon atom) and 32 mol % of copolymerized units of vinyl acetate; OH number after saponification 115 | 574 g |
| Blocked polyisocyanate ( ®IPDI BF 1540 | 248 g |
| Flow agent ( ®Additol XL 496) | 30 g |
| Benzoin | 5 g |
| TiO$_2$ ( ®Kronos 2160) | 300 g |

The powder coating is applied by the corona process at a voltage of 60 kV. The substrate is a 0.8 mm thick iron sheet.

The powder coating is cured for 20 minutes at 200° C. Layer thickness of the cured paint 55 μm.

The coating is exposed to a quick-weathering test, with the following load cycle:

| | |
|---|---|
| UV irradiation at 60° C.: | 8 hours |
| Dew phase at 40° C.: | 4 hours |

The change in the gloss of the coating during the test is followed by measuring the percentage fraction of reflected light intensity, relative to 100% incident light intensity, under mirror reflection (60°) of the surface (DIN Standard 67 530). The results are compiled in Table 1.

TABLE 1

| Time (hours) | Gloss measurement with mirror reflection at 60° (%) |
|---|---|
| 0 | 74 |
| 500 | 74 |
| 1000 | 73 |
| 1500 | 73 |
| 2000 | 71 |
| 2500 | 69 |
| 3000 | 69 |

EXAMPLE 2

Use of a polyanhydride as curing agent

| | |
|---|---|
| Copolymer as in Example 1 | 440 g |
| Polyanhydride ( ®Beckopox Special Curing Agent EH 694) | 180 g |
| Flow agent ( ®Additol XL 496) | 30 g |
| Benzoin | 5 g |
| TiO$_2$ ( ®Kronos 2160) | 345 g |

The powder coating is applied as described in Example 1 and cured for 20 minutes at 180° C. Layer thickness 55 μm. The coating is subjected to a quick-weathering test as described in Example 1. The results are compiled in Table 2.

TABLE 2

| Time (hours) | Gloss measurement with mirror reflection at 60° (%) |
|---|---|
| 0 | 76 |
| 500 | 75 |
| 1000 | 75 |
| 1500 | 73 |
| 2000 | 71 |
| 2500 | 70 |

EXAMPLES 3 and 4

Use of a blocked aliphatic polyisocyanate as curing agent

| | Example 3 | Example 4 |
|---|---|---|
| Copolymer as in Example 1 | 365 g | 335 g |
| Blocked aliphatic polyisocyanate ( ®Additol XL 432) | 330 g | 330 g |
| Benzoin | 5 g | 5 g |
| Flow agent ( ®Additol XL 496) | — | 30 g |
| TiO$_2$ ( ®Kronos 2160) | 300 g | 300 g |

The powder coatings are cured for 10 minutes at 200° C. The layer thickness of the cured paint is 55 μm in both examples. The paint formulations and the coatings are subjected to the usual tests for powder coatings. The results are summarized in Table 3.

TABLE 3

| Test | Example 3 | Example 4 |
|---|---|---|
| Gel time at 180° C. | 305 sec | 315 sec |
| Gloss measurement under mirror reflection (60°) according to DIN 67 530 | 79% | 75% |
| Flow*) | 1 | 2 |
| Craters*) | 0 | 0 |
| Erichsen cupping according to DIN 53 156 | 9.3 mm | 10.0 mm |
| Crosscut*) according to DIN 53 151 | 1 | 1 |
| Impact test according to ASTM D 2794 | | |
| front | 60 ip | 120 ip |
| back | 12 ip | 80 ip |
| Butyl acetate test*) 3 minutes | 2 | 3 |
| Xylene test*) 30 minutes | 2 | 2 |

*)Visual test, rating according to DIN 53 230
0 = very good to 5 = very poor

Test for solvent resistance

Butyl acetate test, xylene test

A cotton wool pad is impregnated with the particular solvent and pressed onto the coating to be tested by means of a glass ring which has a diameter of 15 to 20 mm and a height of 1.5 to 2.0 cm. After the stated time of action, the cotton wool pad is removed and the solvent effect is visually tested. The rating is made visually in accordance with DIN 53 230.

EXAMPLES 5 and 6

Use of a blocked polyisocyanate, free of cleavage products, as curing agent

|  | Example 5 | Example 6 |
|---|---|---|
| Copolymer as in Example 1 | 442 g | 365 g |
| Blocked polyisocyanate (®IPDI BF 1540) | 356 g | 253 g |
| UV stabilizer (®Tinuvin 292) | 10 g | — |
| UV absorber (®Tinuvin 1130) | 10 g | — |
| Benzoin | 5 g | 5 g |
| TiO$_2$ (®Kronos 2160) | — | 300 g |

The powder coatings are cured for 20 minutes at 190° C. The layer thickness of the cured is 60 μm in Example 5 and 55μm in Example 6. The paint formulations and the coatings are subjected to the abovementioned tests. The results are summarized in Table 4.

TABLE 4

| Test | Example 5 | Example 6 |
|---|---|---|
| Gel time at 180° C. | 100 sec | 140 sec |
| Gloss measurement under mirror reflection (60°) according to DIN 67 530 | 98% | 84% |
| Flow*) | 2 | 3 |
| Craters*) | 0 | 0 |
| Erichsen cupping according to DIN 53 156 | 8.5 mm | 6.5 mm |
| Crosscut*) according to DIN 53 151 | 3 | 2 |
| Impact test according to ASTM D 2794 | | |
| front | 24 ip | 20 ip |
| back | 4 ip | 4 ip |
| Butyl acetate test*) 3 minutes | 0 | 0 |
| Xylene test*) 30 minutes | 0 | 0 |

*)Visual test, rating according to DIN 53 230
0 = very good to 5 = very poor

EXAMPLE 7

Comparison example for a fluorine-free powder coating

| Hydroxy-functional polyester resin (®Alftalat AN 739) | 470 g |
|---|---|
| Blocked aliphatic polyisocyanate (®Additol XL 432) | 195 g |
| Flow agent (®Additol XL 496) | 30 g |
| Benzoin | 5 g |
| TiO$_2$ (®Kronos 2160) | 300 g |

The powder coating is applied as described in Example 1 and cured for 20 minutes at 200° C. The layer thickness is 50 μm. The paint formulation and the coating are subjected to the conventional tests for powder coatings. The results are compiled in Table 5.

TABLE 5

| Test | Result |
|---|---|
| Gel time at 180° C. | 450 sec |
| Gloss measurement under mirror reflection (60°) according to DIN 67 530 | 94% |
| Flow*) | 2 |
| Craters*) | 0 |
| Erichsen cupping according to DIN 53 156 | 11.2 mm |
| Crosscut*) according to DIN 53 151 | 0 |
| Impact test according to ASTM D 2794 | |
| front | 40 ip |
| back | 20 ip |
| Butyl acetate test*) 3 minutes | 4 |
| Xylene test*) 30 minutes | 5 |

*)Visual test. rating according to DIN 53 230
0 = very good to 5 = very poor

The powder paint coating is subjected to a quick-weathering test as indicated in Example 1, but with the following load cycle:

| UV irradiation at 70° C.: | 8 hours |
|---|---|
| Dew phase at 50° C.: | 4 hours |

The results are compiled in Table 6

TABLE 6

| Time (hours) | Gloss measurement with mirror reflection at 60° (%) |
|---|---|
| 0 | 92 |
| 100 | 92 |
| 200 | 92 |
| 300 | 81 |
| 400 | 40 |
| 500 | 26 |
| 600 | 20 |

We claim:

1. A fluorine-containing powder coating composition, comprising
   a) 40 to 80% by weight of a pulverulent, crosslinkable, fluorine-containing copolymer, comprising
      α) 10 to 60 mol % of copolymerized units of a vinyl ester of the general formula $$CH_2=CH-O-CO-\underset{R^3}{\overset{R^1}{\underset{|}{\overset{|}{C}}}}-R^2,$$

in which $R^1$, $R^2$ and $R^3$ are alkyl radicals, each complete acyl radical of said vinyl ester having 9 carbon atoms, at least one isomer of said acyl radical having two quaternary carbon atoms; a said isomer with only one quaternary carbon atom, if present, being present to the extent of not more than 80 mol % of the acyl radicals and having at least one tertiary carbon atom in the acyl radical in addition to the quaternary carbon atom,
   β) 20 to 50 mol % of copolymerized units of a vinyl monomer containing OH groups; provided, that the total of α)+β) does not exceed 90 mol %, and
   γ) at least 10 mol %, up to the balance of copolymerized units of the copolymer, of a fluoro-olefin of the general formula $CF_2=CFX$, in which X=F, a perfluoroalkyl radical having 1 to 8 carbon atoms or Cl, and
   b) 20 to 60% by weight of a crosslinking agent suitable for powder coating compositions.

2. A fluorine-containing powder coating composition as claimed in claim 1, comprising 50 to 75% by weight of a crosslinkable, fluorine-containing copolymer of component a) and 25 to 50% by weight for a crosslinking agent of component b).

3. A fluorine-containing powder coating composition as claimed in claim 1, wherein the copolymerized units of component $\beta$) of the fluorine-containing copolymer are derived from a vinyl ester of the formula $$CH_2=CH-O-CO-R^4,$$

in which $R^4$ is a straight-chain alkyl radical having 1 to 3 carbon atoms, 50 to 100% of the copolymerized units of said component $\beta$) having been converted by solvolysis to the corresponding OH form.

4. A fluorine-containing powder coating composition as claimed in claim 1, containing at least 20 mol % of copolymerized units of the fluoro-olefin of component $\gamma$), the total of the components $\alpha)+\beta)$ adding up to 80 mol % or less.

5. A fluorine-containing powder coating composition as claimed in claim 1, wherein the fluoro-olefin of component $\gamma$) is tetrafluoroethylene.

6. A fluorine-containing powder coating composition, as claimed in claim 1, for an electrostatic powder application process, which, after screening of the particles of said pulverulent, crosslinkable, fluorine-containing copolymer, consists essentially of particles having a particle size not larger than about 125 $\mu$m.

7. A fluorine-containing powder coating composition as claimed in claim 1, comprising said pulverulent, crosslinkable, fluorine-containing copolymer from which solvent has been completely removed.

8. A coating composition for an electrostatic powder application process comprising the composition as claimed in claim 7.

9. A coated metallic substrate which has been coated with the coating composition of claim 8.

* * * * *